Figure 1:
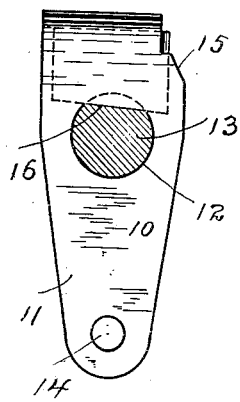

No. 863,687. PATENTED AUG. 20, 1907.
C. C. ABBOTT.
DETACHABLE ARM FOR VOTING MACHINES.
APPLICATION FILED JAN. 14, 1907.

WITNESSES:
Edmund Haskins.
A. B. Camp.

INVENTOR
Charles C. Abbott
BY
A. M. Wooster
ATTORNEY

UNITED STATES PATENT OFFICE.

CHARLES C. ABBOTT, OF PITTSFIELD, MASSACHUSETTS, ASSIGNOR TO TRIUMPH VOTING MACHINE COMPANY, OF PITTSFIELD, MASSACHUSETTS, A CORPORATION OF NEW JERSEY.

DETACHABLE ARM FOR VOTING-MACHINES.

No. 863,687.     Specification of Letters Patent.     Patented Aug. 20, 1907.

Application filed January 14, 1907. Serial No. 352,078.

*To all whom it may concern:*

Be it known that I, CHARLES C. ABBOTT, a citizen of the United States, residing at Pittsfield, county of Berkshire, State of Massachusetts, have invented a new and useful Detachable Arm for Voting-Machines, of which the following is a specification.

This invention has for its object to provide a detachable arm for general use in voting machines, as for example the arms projecting from the voting member shafts in the Triumph voting machine, and carrying pins which are engaged by the party bars. My present invention enables me to make these parts and similar parts in voting machines, which for convenience in this specification I will term arms, from sheet metal and to make them easily attachable to and detachable from the shafts by which they are carried while at the same time they shall be so firmly and rigidly secured in place as to be immovable in use.

With these and other objects in view I have devised the novel sheet metal arm and mode of attaching the same to its shaft which I will now explain, referring to the accompanying drawing forming a part of this specification and using reference characters to indicate the several parts.

Figure 2:
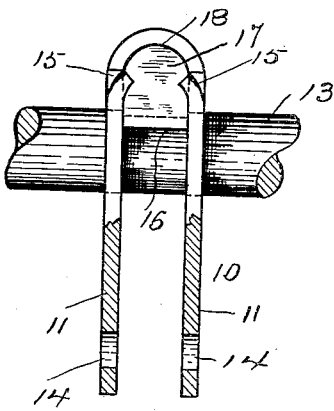
Figure 3:
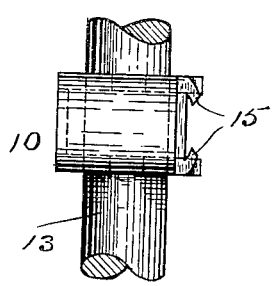
Figure 4:
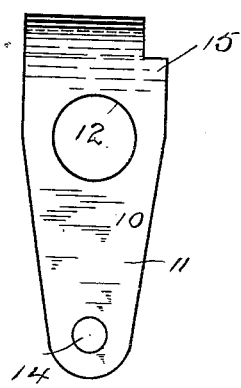
Figure 5:
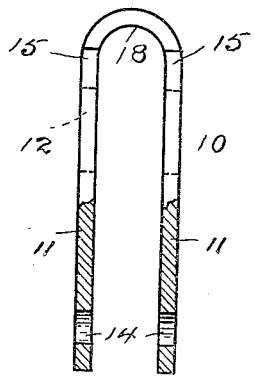
Figure 6:
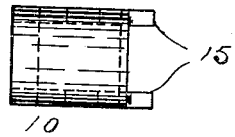
Figure 7:
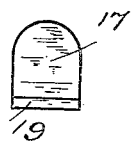
Figure 8:

Figure 1 is a side elevation showing an arm in position on a shaft, the latter being in section; Fig. 2 an edge view corresponding therewith, the shaft appearing in elevation; Fig. 3 a plan view corresponding with Figs. 1 and 2; Fig. 4 a side elevation of the arm detached; Fig. 5 an edge view of the arm detached and partly in section; Fig. 6 a plan view of the arm detached; Fig. 7 an end view of the wedge as seen from the left in Fig 8; and Fig. 8 is a side elevation of the wedge detached.

10 denotes the arm as a whole which is blanked out from sheet metal and bent to substantially U-shape, the free ends of the branches of the arm, which are indicated specifically by 11, being shown as tapering toward their tips. The branches are provided at one side of their mid-length with openings 12 to receive the shaft which is indicated by 13 and, in the present instance, are shown as provided near their tips with holes 14 to receive pins, not shown, which are adapted to be engaged by the party bars, not shown. The branches of the arm are provided with locking ears 15 which when bent to place behind the wedge prevent the removal of the wedge and lock the arm securely to the shaft.

The shaft is provided with a cut-away portion 16, the width of the arm, the base of which is a flat plane slightly inclined to a line at right angles to a radius, see Fig. 1 in connection with Fig. 2.

17 denotes a wedge which is punched out from sheet metal and is shaped to fill the space between the bow of the arm, which is indicated by 18, and the base of the cut-away portion of the shaft. The top of the wedge is rounded to correspond with the bow of the arm, its ends may be parallel and its height at the heel is greater than at its forward end. In other words, the base of the wedge is an incline, indicated by 19, which corresponds with the incline of the cut-away portion of the shaft.

In assembling, the arm is slipped over the shaft to place and then the wedge is placed between the bow of the arm and the base of the cut-away portion of the shaft and driven home, after which the ears 15 are bent inward and over the heel of the wedge, thereby locking the wedge in place between the bow of the arm and the base of the cut-away portion of the shaft and also locking the arm rigidly to the shaft and against the possibility of any movement whatever. I thus provide a simple, inexpensive, easily attached, rigid and efficient arm which may be produced at slight expense, may be placed upon the shaft and locked rigidly in place in a moment's time and may be removed if necessary by bending the ears outward again, then slipping out the wedge and slipping the arm from the shaft.

Having thus described my invention I claim:

1. The combination with a shaft having a cut-away portion, of a U-shaped arm having openings in the branches to receive the shaft and locking ears, and a wedge lying between the bow of the arm and the recess in the shaft and locked in place by bending the ears about it.

2. The combination with a shaft having a cut-away portion the base of which is a plane inclined to a line at right angles to a radius, of a U-shaped arm the width of the recess, and having openings in the branches to receive the shaft, and a wedge lying between the bow of the arm and the recess in the shaft.

3. The combination with a shaft having a cut-away portion with an inclined base, of a U-shaped arm having openings in the branches to receive the shaft and a locking wedge whose top is rounded to correspond with the bow of the arm and whose base is inclined to correspond with the cut-away portion of the shaft by which the arm is locked in place upon the shaft.

In testimony whereof I affix my signature, in presence of two witnesses.

CHARLES C. ABBOTT.

Witnesses:
A. B. CAMP,
GEO. O. B. HAWLEY.